US010552327B2

(12) United States Patent
Esser et al.

(10) Patent No.: US 10,552,327 B2
(45) Date of Patent: Feb. 4, 2020

(54) AUTOMATIC CACHE PARTITIONING

(71) Applicant: Apple Inc., Cupertino, CA (US)

(72) Inventors: Robert P. Esser, Campbell, CA (US); Nikolay N. Stoimenov, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 15/244,590

(22) Filed: Aug. 23, 2016

(65) Prior Publication Data
US 2018/0060238 A1    Mar. 1, 2018

(51) Int. Cl.
G06F 12/0846    (2016.01)
G06F 12/0808    (2016.01)

(52) U.S. Cl.
CPC ...... *G06F 12/0848* (2013.01); *G06F 12/0808* (2013.01); *G06F 2212/282* (2013.01)

(58) Field of Classification Search
None
See application file for complete search history.

(56) References Cited

U.S. PATENT DOCUMENTS

| 5,465,342 | A | 11/1995 | Walsh | |
|---|---|---|---|---|
| 8,782,344 | B2 | 7/2014 | Talagala | |
| 8,886,911 | B2 * | 11/2014 | Nemazie | G11C 16/0483 711/129 |
| 8,972,662 | B2 | 3/2015 | Benhase | |
| 9,176,875 | B2 | 11/2015 | Wang | |
| 9,251,052 | B2 | 2/2016 | Talagala | |
| 9,298,626 | B2 | 3/2016 | Busaba | |
| 9,330,012 | B2 | 5/2016 | Chockler | |
| 2008/0120514 | A1 | 5/2008 | Ismail | |
| 2009/0002379 | A1 | 1/2009 | Baeza | |
| 2010/0174847 | A1 | 7/2010 | Paley | |
| 2012/0124294 | A1 | 5/2012 | Atkisson | |
| 2012/0173907 | A1 * | 7/2012 | Moses | G06F 1/3225 713/321 |
| 2012/0198159 | A1 | 8/2012 | Fujikawa | |
| 2012/0221785 | A1 | 8/2012 | Chung | |

(Continued)

OTHER PUBLICATIONS

Kaxiras, et al., "Cache-line Decay: A Mechanism to Reduce Cache Leakage Power," vol. 2008 of the series Lecture Notes in Computer Science, pp. 82-96.

(Continued)

*Primary Examiner* — Gary W. Cygiel
(74) *Attorney, Agent, or Firm* — Blank Rome LLP

(57) ABSTRACT

Systems, methods, and computer readable media to improve the operation of electronic devices that use integrated cache systems are described. In general, techniques are disclosed to manage the leakage power attributable to an integrated cache memory by dynamically resizing the cache during device operations. More particularly, run-time cache operating parameters may be used to dynamically determine if the cache may be resized. If effective use of the cache may be maintained using a smaller cache, a portion of the cache may be power-gated (e.g., turned off). The power loss attributable to that portion of the cache power-gated may thereby be avoided. Such power reduction may extend a mobile device's battery runtime. Cache portions previously turned off may be brought back online as processing needs increase so that device performance does not degrade.

18 Claims, 5 Drawing Sheets

(56) References Cited

U.S. PATENT DOCUMENTS

| | | | |
|---|---|---|---|
| 2013/0042064 A1 | 2/2013 | Simionescu | |
| 2014/0032853 A1* | 1/2014 | Lih | G06F 12/0817 711/141 |
| 2015/0127912 A1 | 5/2015 | Solihin | |
| 2015/0186280 A1* | 7/2015 | Lepak | G06F 12/121 711/136 |
| 2015/0213638 A1 | 7/2015 | Dimitrov | |
| 2017/0300418 A1* | 10/2017 | Reed | G06F 12/0862 |
| 2018/0004673 A1 | 1/2018 | Anderson et al. | |

OTHER PUBLICATIONS

Kim, et al., "Leakage Current: Moore's Law Meets Static Power," IEEE Computer Society Press, Los Alamitos, CA, USA, vol. 36, Issue 12, Dec. 2003, pp. 68-75.

Kim, Nam Sung, "Circuit and Microarchitectural Techniques for Processor On-Chip Cache Leakage Power Reduction," A dissertation proposal in partial fulfillment of the requirements for the degree of Doctor of Philosophy (Computer Science and Engineering) in the University of Michigan, 2004.

Kondo, Masaaki, "Fine-Grain Power-Gating for Run-Time Leakage Power Reduction," Young Investigators Symposium, 2008.

Meng, et al., "On the limits of leakage power reduction in caches," High-Performance Computer Architecture, 2005, HPCA-11, 11th International Symposium on, Mar. 2005.

Powell, et al., "Gated-VDD: A Circuit Technique to Reduce Leakage in Deep-Submicron Cache Memories," ISLPED '00 Proceedings of the 2000 International Symposium on Low Power Electronics and Design, Jul. 25-27, 2000, p. 90-95.

Yang, et al., "Dynamically Resizable Instruction Cache: An Energy-Efficient and High-Performance Deep-Submicron Instruction Cache," ECE Technical Reports, May 1, 2000.

* cited by examiner

AUTOMATIC CACHE PARTITIONING

BACKGROUND

This disclosure relates generally to cache management. More particularly, but not by way of limitation, this disclosure relates to various techniques to dynamically adjust a cache's size based on current and on-going cache usage.

Power dissipation is a major concern for those designing electronic devices and, in particular, for those designing battery-operated portable electronic devices. Illustrative electronic devices include, but are not limited to, server computer systems, desktop computer systems, mobile devices such as notebook and tablet computer systems, personal entertainment devices such as home entertainment systems and mobile music and video devices, and mobile telephones. For electronic devices in general, higher energy dissipation can require more expensive packaging and cooling technology, which in turn increases cost and decreases system reliability. For mobile devices, higher energy dissipation requires larger batteries for a given run time.

In modern electronic devices there are fundamentally two ways in which power can be dissipated: dynamically (due to transistor switching activity), or statically (mainly due to transistor gate leakage current). One of the most effective ways of reducing the dynamic energy dissipation is to scale down the transistor supply voltage. To maintain high switching speed under reduced voltages however, the threshold voltage must also be scaled down. As transistor threshold voltage drops, it is easier for current to leak through the transistor resulting in significant leakage energy dissipation.

Caches, due to the fact that they can account for the largest fraction of on-chip transistors in many modern processors, are a primary source of power dissipation via leakage current. While a large cache may be justified if used efficiently, for applications with small footprints the power advantage gained by the use of a cache can be out weighed by the leakage power of the larger cache.

SUMMARY

In one embodiment the disclosed concepts provide a method to dynamically resize a cache memory. The method includes obtaining operating parameters of a cache memory during run-time operations (illustrative operating parameters include a cache hit-rate, a cache miss-rate, a cache eviction rate, a number of cache lines older than a first specified time, and a number of cache lines younger than a second specified time—where operational parameters correspond to the cache memory in toto, to a single cache partition, or to one or more cache lines within a cache partition); determining whether a cache-size threshold is satisfied based on one or more of the operating parameters (e.g., thresholds may apply to the cache memory in toto, to a single cache partition, or to one or more cache lines within a cache partition); identifying when the cache-size threshold is satisfied, a first region of the cache memory to power-gate (e.g., to turn off or on); sweeping, when the cache-size threshold comprises a reduce-cache-size threshold, valid cache lines from the first region of the cache memory to a second region of the cache memory (where the second region will continue to be powered); power-gating the first region of the cache memory after sweeping valid cache lines when the reduce-cache-size threshold is satisfied; and power-gating the first region of the cache memory when the cache-size threshold comprises an increase-cache-size threshold. In one embodiment "sweeping" may include moving all valid cache lines occupying the first region of the cache to a portion of the cache that will remain powered (e.g., the second region) or be flushed to main memory (e.g., "dirty" cache lines). In another embodiment, hysteresis may be applied to one or both of the reduce-cache-size and increase-cache-size thresholds. In still another embodiment, a computer executable program to implement the disclosed methods may be stored in any media that is readable and executable by a computer system. In yet another embodiment, all or a portion of the disclosed techniques may be implemented by hardware. In one embodiment, the disclosed methods may be implemented in a portable electronic device.

DETAILED DESCRIPTION

This disclosure pertains to systems, methods, and computer readable media to improve the operation of electronic devices that use integrated cache systems. In general, techniques are disclosed to manage the leakage power attributable to an integrated cache memory by dynamically resizing the cache during device operations. More particularly, run-time cache operating parameters may be used to dynamically determine if the cache may be resized. If effective use of the cache may be maintained using a smaller cache, a portion, region, partition or block of the cache may be power-gated. The power loss attributable to that portion of the cache power-gated may thereby be avoided. Such power reduction may extend a mobile device's battery runtime. In addition, cache portions, regions, blocks or partitions previously turned off may be brought back online as processing needs increase so that device performance does not degrade. In some embodiments the term "power-gated" may be understood to mean that power to a specified cache region is cut (restarted). That is, power to the region is turned off (turned on).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of cache systems having the benefit of this disclosure.

Figure 1:
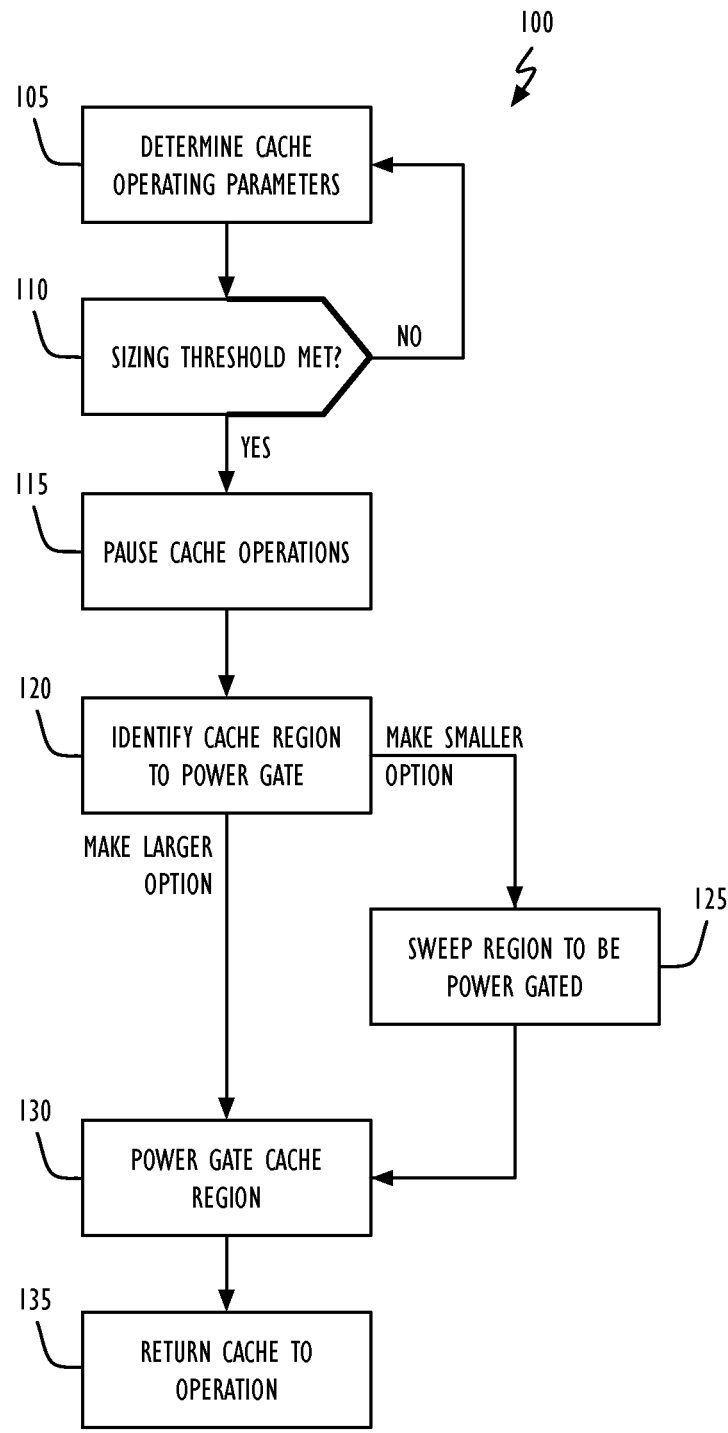
FIG. 1 shows, in flowchart form, a dynamic cache sizing operation in accordance with one embodiment.

Referring to FIG. 1, dynamic cache sizing operation 100 in accordance with one embodiment may obtain or determine one or more cache operating parameters (block 105). Illustrative cache operating parameters include, but are not limited by, cache line eviction rate (i.e., the rate at which cache lines are being removed from the cache in accordance with a specified cache line replacement algorithm) and cache line age (i.e., how long a cache line has been in the cache). Example cache replacement algorithms include least-recently-used (LRU), pseudo-LRU (PLRU), segmented-LRU (SLRU) least-frequently-used (LFU), random replacement, first-in-first-out (FIFO), round robin, and various adaptive replacement algorithms. The parameters may be used to determine if the cache should be resized (block 110). One illustrative resizing test could be whether a first threshold number of cache lines are older than a first specified age (suggesting the cache may be larger than it needs to be). Another illustrative resizing test could be whether a second threshold number of cache lines are younger than a second specified age (suggesting the cache may be smaller than it needs to be). Yet another illustrative resizing test could be whether a third threshold percent of cache lines are older than a third specified age. Still another illustrative resizing test could be whether a fourth threshold percent of cache lines are younger than a fourth specified age. Yet another illustrative resizing test could be whether the cache's eviction rate (i.e., the number of cache lines removed from the cache in a given period of time in accordance with the cache's replacement algorithm) is greater than a fifth threshold. In one embodiment, thresholds may be applied to the cache in toto. In another embodiment, thresholds may be applied to individual cache partitions, blocks or sets (e.g., in an N-way associative cache memory). In still another embodiment, a single operational parameter may be used to determine whether a resizing threshold has been met. In yet another embodiment, two or more operational parameters may be combined to determine whether a resizing threshold has been met (e.g., a weighted sum of different parameter values). In another embodiment, different operational parameters (or combinations thereof) may be used depending upon the electronic device's operational state (e.g., whether in performance mode or power conservation mode or whether powered from an external source or from an internal battery). In still other embodiments, multiple thresholds may be used based on the electronic device's current operational state or cache configuration. If the cache's operating parameters indicate no cache resizing operation is appropriate (the "NO" prong of block 110), operation 100 may resume or loop to block 105. If the cache's operating parameters indicate a cache resizing operation is appropriate (the "YES" prong of block 110), the cache may be placed into a "housekeeping" mode where it is temporarily paused or disabled (block 115).

Figure 2:
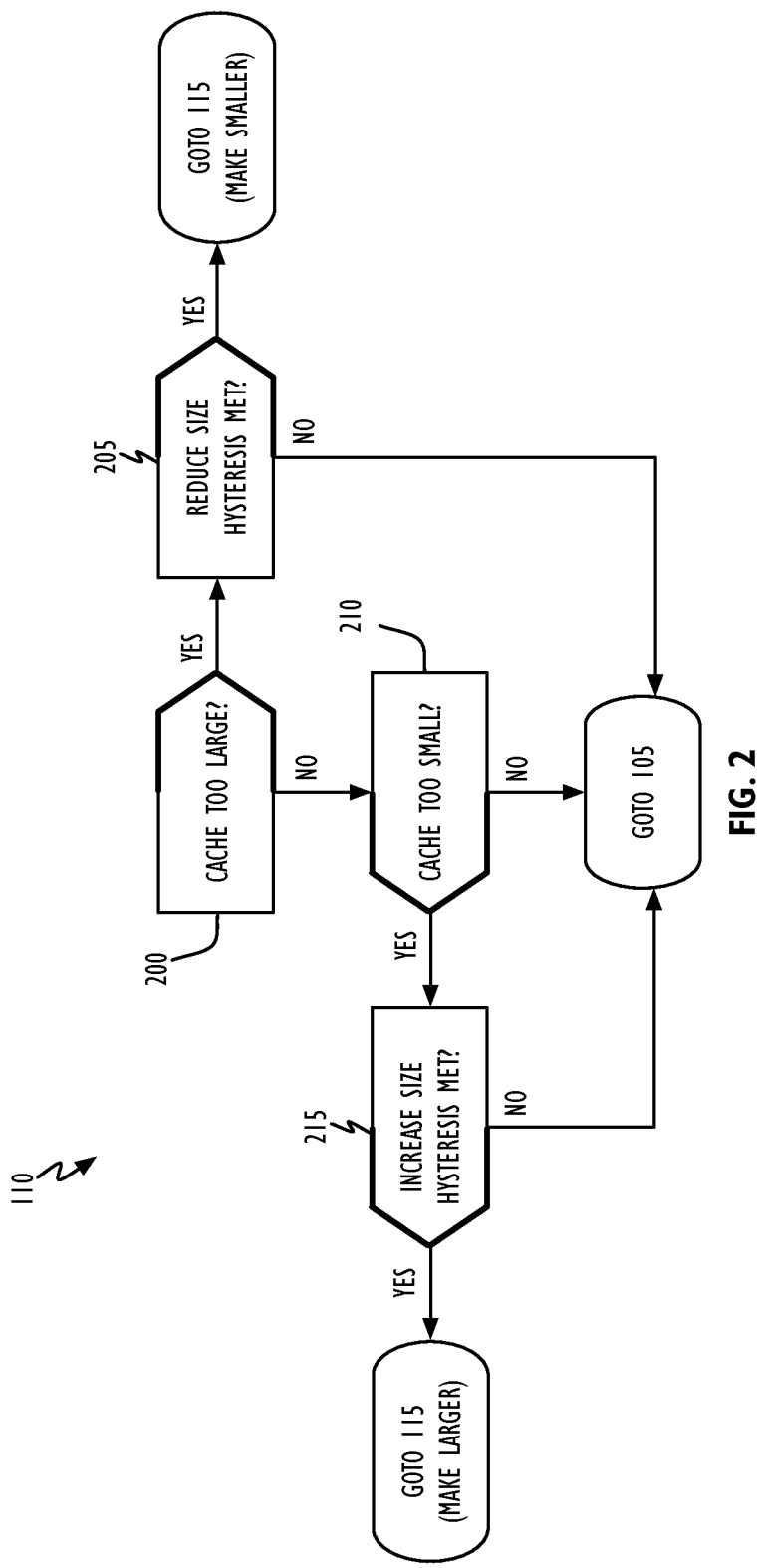
FIG. 2 shows, in flowchart form, a cache resizing test in accordance with one embodiment.

Referring to FIG. 2, in one embodiment cache resizing test 110 may be seen to comprise two separate checks. A first check may be made to determine if the obtained operating parameters indicate the cache is too large (block 200). For example, if more than 'X %' of a cache's lines are older than 'Y' seconds; or if more than 'Z %' of a cache's lines within a partition or set are older than 'W' seconds. If these or similar tests are met (the "YES" prong of block 200), another test may be made to determine if a cache hysteresis constraint is met (block 205). For example, if the last cache resizing operation did not result in enlarging the cache (e.g., was not contrary to the current projected resizing operation), the hysteresis constraint may be met. Alternatively, if more than 'X' seconds have passed since the last resizing operation the hysteresis constraint may be met. Regardless of the specific test, parameter values, or thresholds, if the hysteresis constraint is met (the "YES" prong of block 205), cache resizing operation 100 may proceed to block 115 ("make smaller" option). If the reduce-size-hysteresis threshold is not met (the "NO" prong of block 205), cache resizing operation 100 may return or loop to block 105. If a sizing test suggests the cache is not too large (the "NO" prong of block 200), another test may be made to determine if the cache is too small (block 210). If the cache is not too small (the "NO" prong of block 210), cache resizing operation 100 may proceed to block 115. If, on the other hand, the cache is determined to be too small (the "YES" prong of block 210), a hysteresis-based secondary check may be made (block 215). If the increase-cache-size-hysteresis constraint is not met (the "NO" prong of block 215), cache resizing operation 100 may return or loop to block 105. If the increase-cache-size-hysteresis constraint is met (the "YES" prong of block 215), cache resizing operation 100 may proceed to block 115 ("make larger" option).

Returning to FIG. 1, once it has been determined that the cache should be resized (block 110) and paused (block 115), that region of the cache to be power-gated (i.e., turned off or on) may be determined (block 120). In one embodiment, a cache's operational size may be decreased or increased in fixed increments: e.g., by a factor of two or by a specified amount of memory such as a partition or a specified number of cache lines until a minimum or maximum size is reached. In another embodiment, a cache's operational size may be decreased or increased by a dynamically determined increment based on, for example, the current size of the cache, the value of the monitored operational parameters or the operational mode of the electronic device. In still another embodiment, the amount by which the cache is increased may be different from the amount by which the cache is decreased. In yet another embodiment, the cache may be increased or decreased by an equal amount (or factor) part of the time and by different amounts (or factors) during other times. In still another embodiment, knowledge about the underlying system's operations may be used to optimize the size of the steps by which the cache may be increased or decreased. For example, if a system is designed for graphics display and processing cache increment/decrement sizes may be one value whereas if the system is designed for audio processing the cache increment/decrement sizes may be wholly different. One of ordinary skill in the art would appreciate this difference. The identified region could, by way of example, be a single cache line, a block of cache lines or one or more cache partitions. For example, if the cache is N-way associative it may be reduced to an (N−1)-way associative memory. Alternatively, each of the cache's N partitions may be reduced by a specified amount. In one embodiment, cache regions may be reduced by a factor of two (2). If the "make smaller" option in accordance with FIG. 2 is appropriate, all valid cache lines occupying that region of the cache to be power-gated should be moved to a portion, region or partition of the cache that will remain powered; alternatively, such cache lines may be flushed to main memory (block 125). In one embodiment only cache lines identified as having been modified since last being written to main memory need be flushed to main memory (i.e., "dirty" cache lines). In another embodiment, cache resize operation 100 itself could move cache lines from the region to be disabled to another region (or a subsidiary process/thread). Once the region to be disabled has been cleared or swept of valid cache lines, the identified region can be power-gated and disabled or enabled (block 130). Returning to block 120, if the "make larger" option in accordance with FIG. 2 is appropriate no sweep operation in accordance with block 125 need be performed; the identified cache region may be power-gated directly (block 130). Once the identified region of the cache has been power-gated, the cache memory may be returned to an online status (block 135).

Figure 3:
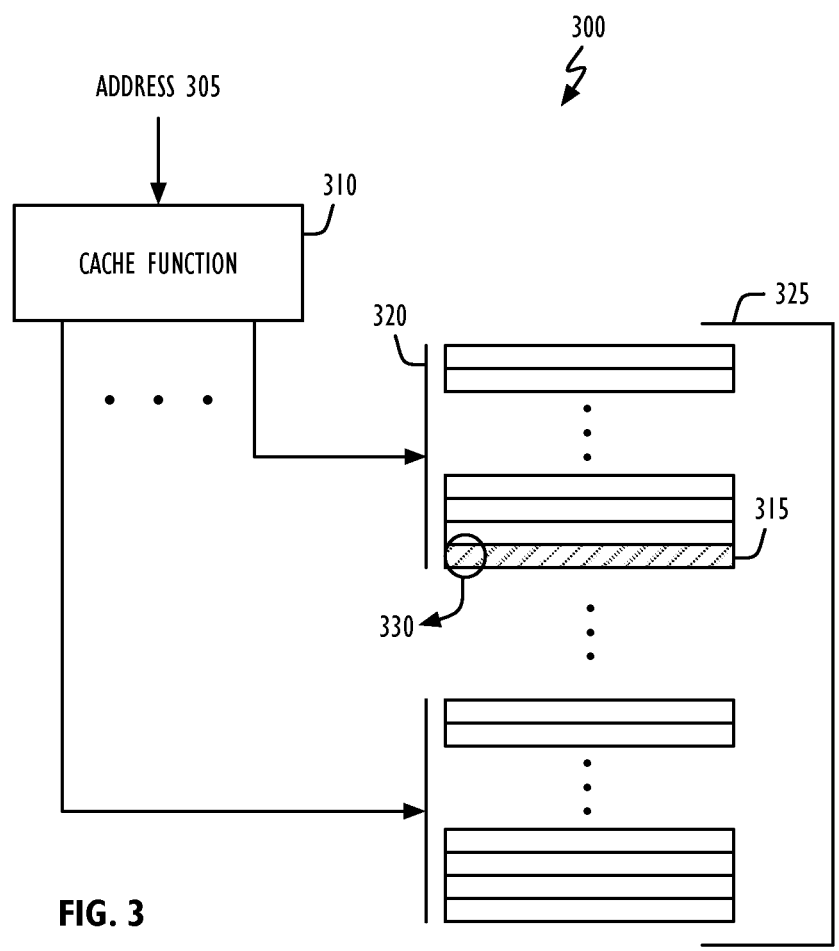
FIG. 3 shows, in block diagram form, a cache access operation in accordance with one embodiment.

Referring to FIG. 3, in general the manner in which cache systems work (e.g., cache system 300) is that address 305 is operated upon by cache function 310 which results in a cache address that selects cache line 315 in cache partition 320 from cache memory 325. Once selected, at least the data contents of cache line 315 may be provided to the process issuing address 305, where the "data" may comprise data or address information. In addition to data, each cache line (e.g., 315) also typically includes one or more flags or tags 330. For example, tags 330 could indicate when the particular cache line was initially brought into cache memory 325, the last time the particular cache line was accessed, or that the particular cache line was accessed within a predefined period. Tags 330 could also indicate if the particular cache line includes data that has been altered since last written to main memory (i.e., a "dirty" flag). It should be appreciated that as cache lines are brought online when enlarging the cache size, or taken offline when shrinking the cache size, the number of bits needed to span the available cache memory may need to change—that is, cache function 310 may need to be altered. In one embodiment, cache function 310 may be altered as part of actions in accordance with any one of blocks 120-135. The precise manner in which cache function 310 is modified may be unique to each given implementation and may, in general, be performed in any manner desired so long as the functional nature of the cache is maintained.

Figure 4:
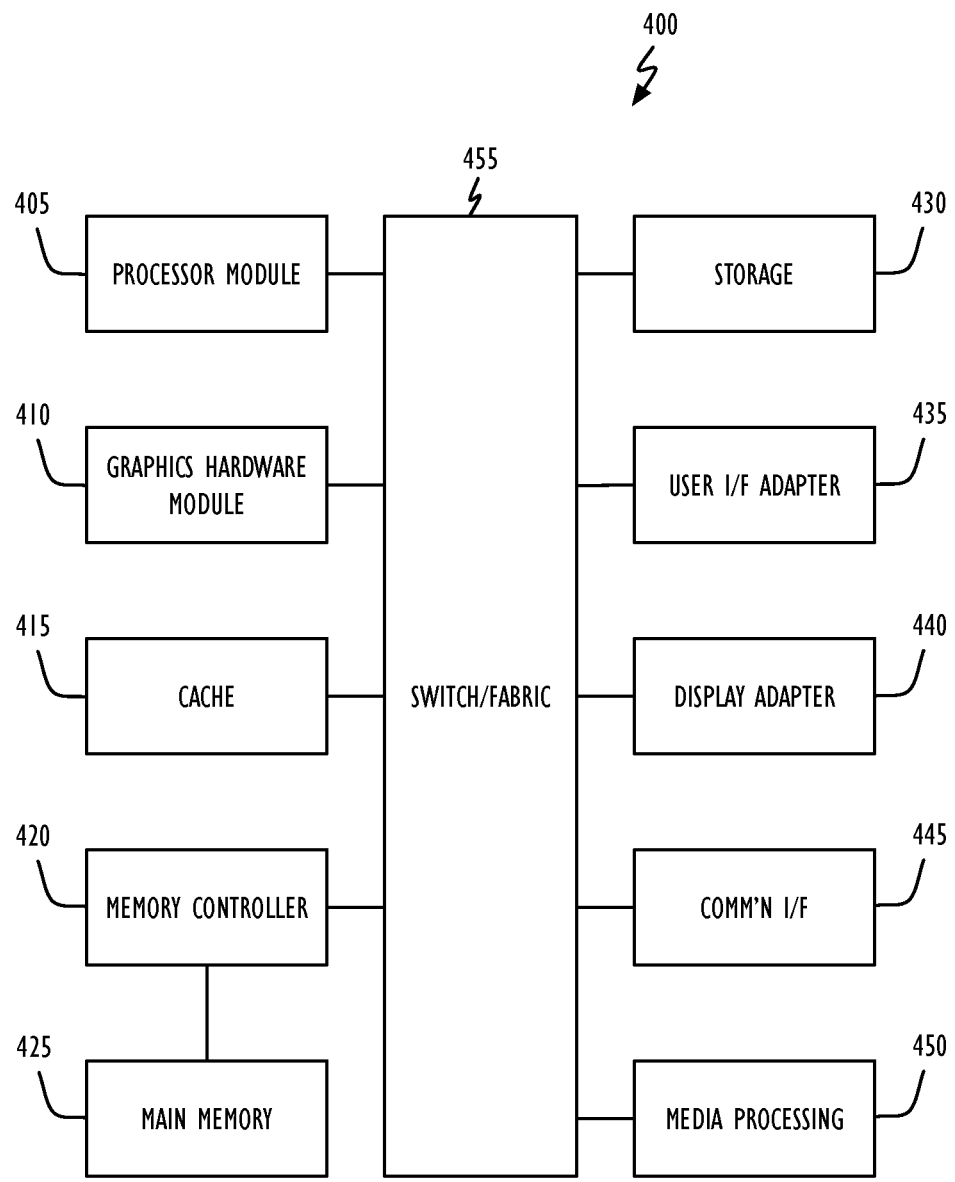
FIG. 4 shows, in block diagram form, an electronic device in accordance with one embodiment.

Referring to FIG. 4, electronic device 400 in accordance with this disclosure may include one or more processor modules 405, one or more graphics hardware modules 410, cache memory 415, memory controller 420, main memory 425, one or more storage devices 430, user interface adapter 435, one or more display adapters 440, communication interface 445 and one or more media processing modules 450. Switching network or fabric 455 may be used to interconnect the device's different components. Processor module or circuit 405 may include one or more processing units each of which may include at least one central processing unit (CPU) and/or at least one graphics processing unit (GPU); each of which in turn may include one or more processing cores. Each processing unit may be based on reduced instruction-set computer (RISC) or complex instruction-set computer (CISC) architectures or any other suitable architecture. Each processor module 405 may be a system-on-chip, an encapsulated collection of integrated circuits (ICs), or a collection of ICs affixed to one or more substrates. Each graphics hardware module or circuit 410 may be special purpose computational hardware for processing graphics and/or assisting processor module 405 perform computational tasks. In one embodiment, each graphics hardware module or circuit 410 may include one or more GPUs, and/or one or more programmable GPUs and each such unit may include one or more processing cores. Cache 415 may represent high speed memory such as static random access memory (SRAM). In general, cache memory 415 represents any possible cache hierarchy. In one embodiment cache memory 415 may be available to processes originating from a number of different device elements. By way of example, from processes associated with a processor module 405, a graphics hardware module 410, memory controller 420, a storage unit 430, user interface adapter 435, a display adapter 440, a communication interface 445 and a media processing module or circuit 450. In another embodiment cache 415 may be limited to processes originating from a single device element such as from a processor module (e.g., 405 or 410). Memory controller 420 manages the flow of data going to and from main memory 425. Memory controller 420 may be a separate IC or incorporated as part of another IC, such as being placed on the same die or as an integral part of a processor module 405. Main memory 425 may include one or more different types of media, typically dynamic random access memory (DRAM), used by processor modules 405, graphics hardware modules 410, and other elements of device 400. Storage 430 may include one more non-transitory storage mediums including, for example, magnetic disks (fixed, floppy, and removable) and tape, optical media such as CD-ROMs and digital video disks (DVDs), and semiconductor memory devices such as Read-Only Memory (ROM), Electrically Programmable Read-Only Memory (EPROM), and Electrically Erasable Programmable Read-Only Memory (EEPROM). Memory 425 and storage 430 may be used to retain media (e.g., audio, image and video files), preference information, device profile information, computer program instructions or code organized into one or more modules and written in any desired computer programming language, and any other suitable data. When executed by a processor module 405 and/or a graphics hardware module 410 and/or other functional elements (e.g., a media processing module or circuit 450) within device 400, such computer program code may implement one or more of the methods described herein. User interface adapter 435 may be used to connect a keyboard, a microphone, pointer devices, speakers and other user interface devices such as a touch-pad and/or a touch screen (not shown). Each display adapter 440 may be used to connect one or more display units (not shown) which may also provide touch input capability. Each communication interface 445 may be used to connect electronic device 400 to one or more networks. Illustrative networks include, but are not limited to, a local network such as a Universal Serial Bus (USB) network, an organization's local area network, and a wide area network such as the Internet. Communication interface 445 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Each media processing module or circuit 450 may incorporate or use the necessary resources (hardware and software) to process media streams of the type described herein with respect to FIGS. 1 and 4. Communication switch or fabric 455 may be comprised of one or more continuous (as shown) or discontinuous communication links and be formed as a bus network, a communication network, or a fabric comprised of one or more switching devices.

Figure 5:
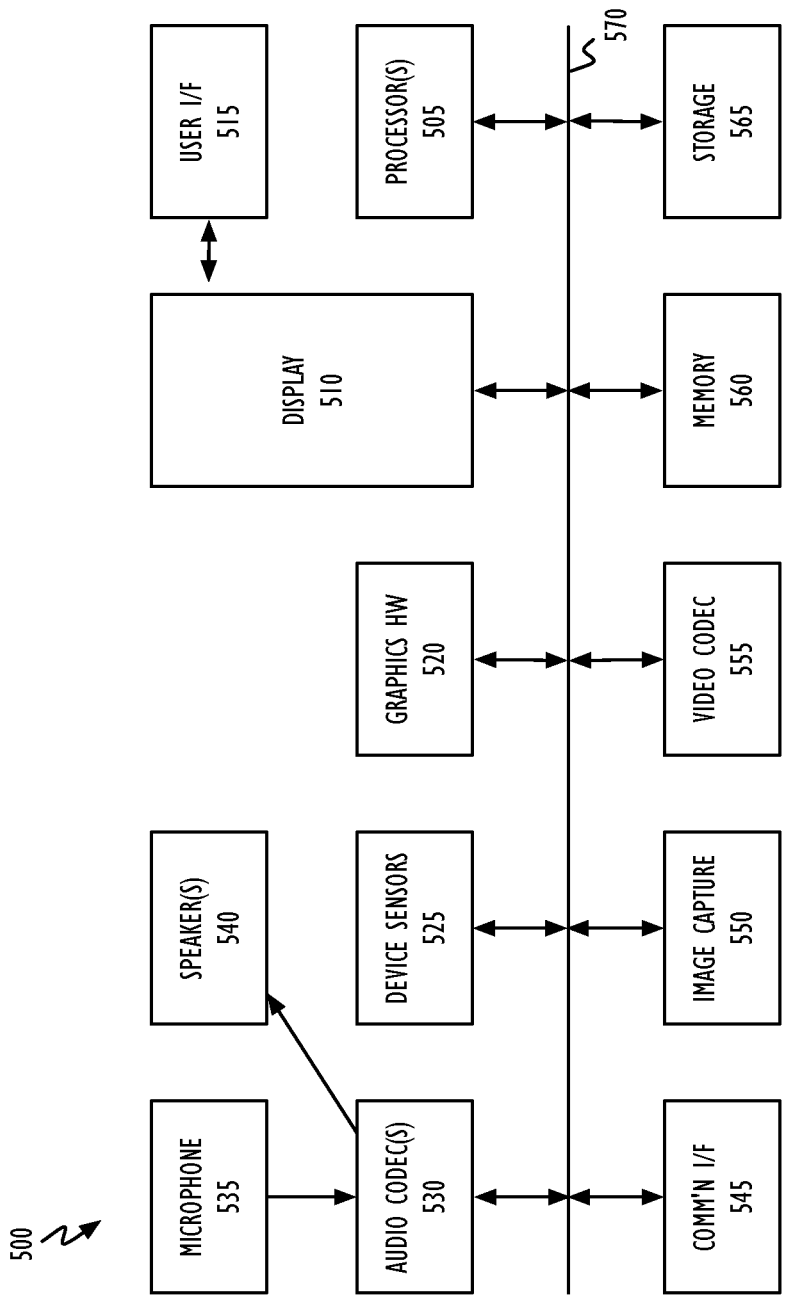
FIG. 5 shows, in block diagram form, a mobile electronic device in accordance with one embodiment.

Referring to FIG. 5, a simplified functional block diagram of illustrative mobile electronic device 500 is shown according to one embodiment. Mobile electronic device 500 could be, for example, a mobile telephone, personal media or entertainment device, a notebook computer system, or a tablet computer system. As shown, mobile electronic device 500 may include processor 505, display 510, user interface 515, graphics hardware 520, device sensors 525, microphone 530, audio codec(s) 535, speaker(s) 540, communications interface circuitry 545, image capture circuit or unit 550, video codec(s) 555, memory 560, storage 565, and communications network 570. Processor 505, display 510, user interface 515, graphics hardware 520, communications interface circuitry 545, memory 560, storage 565, and communication's network 570 may be of the same or similar type and serve the same function as the similarly named component described above with respect to FIG. 4. In addition, memory 560 may include cache memory (e.g., cache memory 415). Further, cache memory of the type partitioned in accordance with this disclosure may be incorporated in one or more other functional modules (e.g., modules 505, graphics hardware 520, audio and video codecs 530 and 555 respectively and image capture unit 550). Device sensors 525 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Audio codec(s) 530 may take input from microphone(s) 535 (or processor module 505, communication interface 545, memory 560 or storage 565) and generate output to one or more speakers 540. Audio signals obtained via microphone 530 may be, at least partially, processed by audio codec(s) 535. Data so captured may be stored in memory 560 and/or storage 565 and/or output through speakers 540. Image capture circuitry 550 may capture still and video images. Output from image capture circuitry 550 may be processed, at least in part, by video codec(s) 555 and/or processor 505 and/or graphics hardware 520, and/or a dedicated image processing unit incorporated within image capture circuitry 550. Images so captured may be stored in memory 560 and/or storage 565.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, operations in accordance with FIG. 1-3 may be applied to systems in accordance with either FIG. 4 or 5. Further, one or more actions as disclosed in FIGS. 1-3 may be omitted, repeated, and/or performed in a different order than that described herein. By way of example, hysteresis in accordance with FIG. 2 need not be implemented in every embodiment. In addition, as cache resizing operation 100 is, at least in some implementations, directed to reducing power consumption, if this is not relevant or important cache resizing operation 100 need not be performed. For example, if a portable electronic device is receiving power from a wall source it may not be essential to periodically resize one or more of the device's operational caches as disclosed herein. On the other hand, if the device is operating on battery power cache resizing operation 400 may prove beneficial. Accordingly, the specific arrangement of steps or actions shown in FIGS. 1-3 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to change a cache's operational size based on cache activity, comprising:
   obtaining an operating parameter of a cache memory during run-time operations, wherein the operating parameter is based on, for each of a plurality of cache lines of the cache memory, a tag in the cache line containing information regarding an age of the cache line, wherein the information regarding the age indicates when the cache line was initially brought into the cache memory;
   determining whether a cache-size threshold is satisfied based on the operating parameter;
   identifying a first region of the cache memory to power-gate when the cache-size threshold is satisfied;
   when the cache-size threshold comprises a reduce-cache-size threshold: (i) sweeping valid cache lines from the first region of the cache memory to a second region of the cache memory, and (ii) power-gating the first region of the cache memory after sweeping valid cache lines, wherein the reduce-cache-size threshold is satisfied when a first threshold number or percentage of cache lines from among the plurality of cache lines are older than a first specified age; and
   when the cache-size threshold comprises an increase-cache-size threshold, power-gating the first region of the cache memory, wherein the increase-cache-size threshold is satisfied when a second threshold number or percentage of cache lines from among the plurality of cache lines are younger than a second specified age.

2. The method of claim 1, wherein the operating parameter includes at least one of a cache hit-rate, a cache miss-rate, a cache eviction rate, a number of cache lines older than a first specified time, and a number of cache lines younger than a second specified time.

3. The method of claim 1, wherein the first region comprises a single cache line of the plurality of cache lines in each of one or more cache partitions, multiple cache lines of the plurality of cache lines in each of one or more cache partitions, or a cache partition.

4. The method of claim 1, wherein sweeping comprises:
   identifying cache lines that have been modified since the last time they were written to a main memory; and
   writing the modified cache lines to the main memory.

5. The method of claim 1, wherein the reduce-cache-size threshold incorporates hysteresis.

6. The method of claim 1, wherein power-gating comprises:
   turning power off to the first region when the operating parameter satisfies the reduce-cache-size threshold; and turning power on to the first region when the operating parameter satisfies the increase-cache-size threshold.

7. A non-transitory program storage device, readable by a processor and comprising instructions stored thereon to cause one or more processors to:
obtain an operating parameter of a cache memory during run-time operations, wherein the operating parameter is based on, for each of a plurality of cache lines of the cache memory, a tag in the cache line containing information regarding an age of the cache line, wherein the information regarding the age indicates when the cache line was initially brought into the cache memory;
determine whether a cache-size threshold is satisfied based on the operating parameter;
identify a first region of the cache memory to power-gate when the cache-size threshold is satisfied;
when the cache-size threshold comprises a reduce-cache-size threshold: (i) sweep valid cache lines from the first region of the cache memory to a second region of the cache memory, and (ii) power-gate the first region of the cache memory after sweeping valid cache lines, wherein the reduce-cache-size threshold is satisfied when a first threshold number or percentage of cache lines from among the plurality of cache lines are older than a first specified age; and
when the cache-size threshold comprises an increase-cache-size threshold, power-gate the first region of the cache memory, wherein the increase-cache-size threshold is satisfied when a second threshold number or percentage of cache lines from among the plurality of cache lines are younger than a second specified age.

8. The non-transitory program storage device of claim 7, wherein the operating parameter includes at least one of a cache hit-rate, a cache miss-rate, a cache eviction rate, a number of cache lines older than a first specified time, and a number of cache lines younger than a second specified time.

9. The non-transitory program storage device of claim 7, wherein the first region comprises a single cache-line of the plurality of cache lines in each of one or more cache partitions, multiple cache-lines of the plurality of cache lines in each of one or more cache partitions, or a cache partition.

10. The non-transitory program storage device of claim 7, wherein the instructions to sweep comprise instructions to:
identify cache lines that have been modified since the last time they were written to a main memory; and
write the modified cache lines to the main memory.

11. The non-transitory program storage device of claim 7, wherein the reduce-cache-size threshold incorporates hysteresis.

12. The non-transitory program storage device of claim 7, wherein the instructions to power-gate comprise instructions to:
turn power off to the first region when the operating parameter satisfies the reduce-cache-size threshold; and
turn power on to the first region when the operating parameter satisfies the increase-cache-size threshold.

13. A portable electronic device, comprising:
main memory;
cache memory; and
one or more processors operatively coupled to the main memory and the cache memory and configured to execute instructions stored in the main memory to cause the portable electronic device to
obtain an operating parameter of the cache memory during run-time operations, wherein the operating parameter is based on, for each of a plurality of cache lines of the cache memory, a tag in the cache line containing information regarding an age of the cache line, wherein the information regarding the age indicates when the cache line was initially brought into the cache memory,
determine whether a cache-size threshold is satisfied based on the operating parameter,
identify a first region of the cache memory to power-gate when the cache-size threshold is satisfied,
when the cache-size threshold comprises a reduce-cache-size threshold: (i) sweep valid cache lines from the first region of the cache memory to a second region of the cache memory, and (ii) power-gate the first region of the cache memory after sweeping valid cache lines, wherein the reduce-cache-size threshold is satisfied when a first threshold number or percentage of cache lines from among the plurality of cache lines are older than a first specified age, and
when the cache-size threshold comprises an increase-cache-size threshold power-gate the first region of the cache memory, wherein the increase-cache-size threshold is satisfied when a second threshold number or percentage of cache lines from among the plurality of cache lines are younger than a second specified age.

14. The portable electronic device of claim 13, wherein the operating parameter includes at least one of a cache hit-rate, a cache miss-rate, a cache eviction rate, a number of cache lines older than a first specified time, and a number of cache lines younger than a second specified time.

15. The portable electronic device of claim 13, wherein the first region comprises a single cache-line of the plurality of cache lines in each of one or more cache partitions, multiple cache-lines of the plurality of cache lines in each of one or more cache partitions, or a cache partition.

16. The portable electronic device of claim 13, wherein the instructions that cause the portable electronic device to sweep comprise instructions that cause the portable electronic device to:
identify cache lines that have been modified since the last time they were written to the main memory; and
write the modified cache lines to the main memory.

17. The portable electronic device of claim 13, wherein the reduce-cache-size threshold incorporates hysteresis.

18. The portable electronic device of claim 13, wherein the instructions that cause the portable electronic device to power-gate comprise instructions that cause the portable electronic device to:
turn power off to the first region having the given size when the operating parameters satisfy the reduce-cache-size threshold; and
turn power on to the first region having the given size when the operating parameters satisfy the increase-cache-size threshold.

* * * * *